US007747018B2

(12) United States Patent
Marino

(10) Patent No.: US 7,747,018 B2
(45) Date of Patent: *Jun. 29, 2010

(54) METHOD AND APPARATUS FOR PROVIDING A MESSAGE SEQUENCE COUNT IN A SECURITY SYSTEMS

(75) Inventor: Francis C Marino, Dix Hills, NY (US)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/123,450

(22) Filed: May 19, 2008

(65) Prior Publication Data

US 2008/0218336 A1 Sep. 11, 2008

Related U.S. Application Data

(63) Continuation of application No. 10/264,214, filed on Oct. 2, 2002, now abandoned.

(51) Int. Cl.
*H04L 9/00* (2006.01)

(52) U.S. Cl. ....................... 380/262; 380/270; 713/153; 340/506

(58) Field of Classification Search ................. 380/262, 380/270; 340/506; 713/153
See application file for complete search history.

(56) References Cited

U.S. PATENT DOCUMENTS

| | | | | |
|---|---|---|---|---|
| 3,876,979 | A * | 4/1975 | Winn et al. | 714/748 |
| 3,979,719 | A * | 9/1976 | Tooley et al. | 714/748 |
| 4,644,532 | A * | 2/1987 | George et al. | 370/255 |
| 4,665,520 | A * | 5/1987 | Strom et al. | 714/15 |
| 5,151,899 | A * | 9/1992 | Thomas et al. | 370/394 |
| 5,485,370 | A * | 1/1996 | Moss et al. | 709/217 |
| 5,506,905 | A * | 4/1996 | Markowski et al. | 380/262 |
| 5,907,279 | A * | 5/1999 | Bruins et al. | 340/506 |
| 6,118,765 | A * | 9/2000 | Phillips | 370/235 |
| 2002/0078151 | A1* | 6/2002 | Wickam et al. | 709/204 |
| 2004/0158333 | A1* | 8/2004 | Ha et al. | 700/3 |

* cited by examiner

*Primary Examiner*—Carl Colin
(74) *Attorney, Agent, or Firm*—Barkume & Associates, P.C.

(57) ABSTRACT

A security system and method of operation includes a wireless transmitter, a wireless receiver in wireless communication with the wireless transmitter, and a control panel. The transmitter transmits a wireless message, including a unique transmitter identification number, a status portion with a plurality of status bits, and a sequence count which it increments only when any one of the status bits changes. The receiver receives the wireless message, converts the wireless message to a digital message which is sent to the control panel. The control panel processes the digital message by extracting the sequence count and transmitter identification number. A previous sequence count associated with the transmitter identification number is retrieved from memory, and the sequence count from the message is compared with the previous sequence count. If the sequence count is not less than the previous sequence count, then the control panel processes the message.

18 Claims, 13 Drawing Sheets

PRODUCT TYPE TABLE

| DESCRIPTION | BIT 4 | BIT 3 | BIT 2 | BIT 1 | BIT 0 | ESSENTIAL? (YES = 1) |
|---|---|---|---|---|---|---|
| PIR MOTION | 0 | 0 | 0 | 0 | 0 | 0 |
| SMOKE | 0 | 0 | 0 | 0 | 1 | 1 |
| HEAT | 0 | 0 | 0 | 1 | 0 | 1 |
| DOOR | 0 | 0 | 0 | 1 | 1 | 1 |
| MICROWAVE MOTION | 0 | 0 | 1 | 0 | 0 | 0 |
| WINDOW | 0 | 0 | 1 | 0 | 1 | 1 |
| ⋮ | | | | | | |
| | 1 | 1 | 1 | 1 | 1 | 0 |

FIGURE 7

METHOD AND APPARATUS FOR PROVIDING A MESSAGE SEQUENCE COUNT IN A SECURITY SYSTEMS

CROSS-REFERENCE TO RELATED APPLICATIONS

This application is a continuation application of Ser. No. 10/264,214 filed Oct. 2, 2002, which is related to U.S. application Ser. No. 10/264,329 filed Oct. 2, 2002 now U.S. Pat. No. 6,930,604, Ser. No. 10/263,625 filed Oct. 2, 2002 now U.S. Pat. No. 6,690,276, and Ser. No. 10/264,202 filed Oct. 2, 2002 now U.S. Pat. No. 6,987,450.

FIELD OF THE INVENTION

This invention relates to security systems, and in particular to a method and system for providing a sequence count in transmitted wireless messages that enable a control panel to determine if a message is received out of sequence and thus should be ignored.

BACKGROUND OF THE INVENTION

The present invention addresses several problems found in large wireless security systems. The first problem is caused by wireless security systems that utilize a large number of wireless motion detector transmitters. When the security system is in the armed state, these motion detector devices are not activated due to the lack of people moving about in the protected premises. However, when the security system is in the disarmed state, these motion detector devices are constantly transmitting signals to the associated RF receivers due to their detection of people moving within the protected premises while the control panel is disarmed. Since the control panel is disarmed, these transmitted signals have no significance and are therefore discarded by the control panel. However, the frequent signal transmissions from these types of transmitters cause a large amount of unnecessary signal traffic on the wired communication bus connecting the control panel to the RF receivers. In effect, these unnecessary signal transmissions hamper the ability of the control panel to service signals transmitted from other devices, wired and wireless, which need immediate attention even when the system is disarmed.

It is therefore an object of the present invention to provide a wireless security system that overcomes the problems of the prior art mentioned above.

It is also an object of the present invention to provide such a security system that ameliorates the unwanted processing requirements on the control panel due to motion detector transmissions (and other non-essential transmissions) that occur during the system disarmed state.

In particular, it is an object of the present invention to provide such a security system that can process the received messages at the receiver module and filter the messages that originate from non-essential transmitters, so that such non-essential messages are not passed on to the control panel when in the disarmed state.

The second problem found in large wireless security systems relates to the use of a large number of wireless receivers in a system that are connected to the control panel. Although most currently available wireless security systems are limited to the use of not more than two receivers on a single system, it is desired to be able to use more receivers in larger premises. That is, this limitation is restrictive in relatively large systems where more than two RF receivers are necessary in order to properly detect signals from all of these transmitting devices distributed over a very wide area in the system. For example, in a six-story building containing, twenty transmitting devices per floor, it would be best to have one RF receiver located on each floor in order to avoid large amounts of RF transmission loss between multiple floors which are generally constructed of steel-enforced flooring materials. However, placing 6 RF receivers on the same security control's communication bus makes it almost impossible for the control to differentiate between recent and previous transmission events from a given transmitting device or to identify a single transmission event reaching the control via each of some of the receivers at slightly different time intervals. This is further aggravated by the fact that in most wireless systems, a given transmission event involves the transmission of a multiple number of identical transmitted messages over a period of 2-4 seconds in order to ensure adequate reception by a given receiver. For example, it may be desirable to transmit messages in a sextet format, where the (usually) identical message is transmitted six times over the 2-4 second period to ensure proper reception by the control panel.

It is therefore a further object of the present invention to provide such a security system that allows the control panel to determine if a message is received out of sequence and to ignore its contents, accordingly.

The third problem found in large wireless security systems relates to the additional traffic generated on the control's communication bus when a multiplicity of RF receivers are connected. In the above example using 6 RF receivers, a single sensor event could cause the generation of up to six identical messages to the control. These additional messages could cause the control's communication bus to become overloaded.

It is therefore a further object of the present invention to provide such a security system that allows each receiver to monitor the transmissions between the control panel and the other receivers to determine if a message has already been transmitted to and acknowledged by the control panel and avoid repetitive transmissions to the control panel.

The fourth problem encountered relates to the tedious and time-consuming task required of the system installer in programming responses to be carried out by the control panel when it receives a message from a given transmitter in the system. That is, at the time of installation, the installer must assign a particular response type to a particular serial or identification number for each transmitter in the system. Examples of response type are fire, perimeter, entry/exit door, panic, interior (motion), and interior-follower (motion looking at the entry door). During the control panel programming, the installer will assign a panel fire response to the smoke detectors, a burglary response type to perimeter serial numbers, etc. In some control panels, there may be 256 zones that need to be programmed, which is time consuming and error prone.

It is therefore desired to provide a methodology whereby the control panel can determine the type of product from the received message and execute a response accordingly, without having to carry out programming for each transmitter as in the prior art.

SUMMARY OF THE INVENTION

The present invention, in a first aspect, is thus a method and apparatus for use in a security system that includes a number of wireless transmitters, at least one wireless receiver in wireless communication with the wireless transmitter(s), and a control panel connected to the wireless receiver(s). The receiver receives a wireless message from a transmitter and first determines if the system is in the disarmed mode. If it is in the disarmed mode, then the receiver determines the product type of the wireless transmitter from the wireless message. The receiver then determines from the transmitter product type if the transmitter is essential or non-essential. The receiver discards the wireless message if the transmitter is indicated to be non-essential, and it sends the wireless message to the control panel if the transmitter is indicated to be essential.

In accordance with this first aspect of the invention, the receiver determines if the system is in the disarmed mode by checking a system status bit in an internal memory location. The receiver determines from the product type of the received transmitted message if the message is essential or non-essential by checking the transmitter product type against a product type table in memory in the receiver. The product type table is loaded into memory in the receiver from a communications bus message previously sent by the control panel to the receiver.

The present invention, in a second aspect, is a security system and method of operating the security system which includes a wireless transmitter, two or more receivers in wireless communication with the wireless transmitter, and a control panel connected to the wireless receivers. The transmitter transmits a wireless message per event, such as the opening and closing of a door, which includes a unique transmitter identification number, a status portion with a plurality of status bits identifying the event, and a sequence count. Each receiver receives the wireless message, converts the wireless message to a digital message, and then sends the digital message to the control panel. The control panel then processes the digital message from each receiver by first extracting the sequence count and transmitter identification number from the message. A previous sequence count associated with the same transmitter identification number of a previous event is retrieved from memory, and the sequence count from the present message is compared with the previous sequence count retrieved from the memory. If the sequence count from the present message is less than the previous sequence count, then the control panel ignores the present message. If, however, the sequence count from the message is not less than the previous sequence count, then the control panel processes the message (i.e. the status bits) and replaces the previous sequence count in memory with the sequence count from the present message.

In further accordance with this second aspect of the invention, the transmitter prepares the message for wireless transmission to the receiver by first determining if any of the status bits in the status portion of the wireless message has changed from the previously transmitted message as a result of a new transmission event. If any of the status bits have changed, indicating a new transmission event, then the transmitter increments the sequence count from the previously transmitted message. If, however, none of the status bits has changed, indicating a repeated message of the same event, then the transmitter uses the same sequence count as in the previously transmitted message.

This second aspect of the invention thereby allows the control panel to determine if a message received from a certain transmitter is out of sequence due to delays in reception, processing, etc. by one of the receivers in the system.

The present invention, in a third aspect, is a security system and method of operating the security system which includes a wireless transmitter, a plurality of wireless receivers in wireless communication with the wireless transmitter, and a control panel connected to the wireless receivers via a data communications bus. A first receiver receives a first wireless message, converts the first wireless message to a first digital message, and then sends the first digital message to the control panel. A second receiver receives a second wireless message, converts the second wireless message to a second digital message, and places the second digital message in an output buffer for subsequent transmission to the control panel. The control panel receives the first digital message from the first receiver, and then sends an acknowledgement message on the data bus indicating that the first digital message has been successfully received. The second receiver monitors data transmissions on the data communications bus from the control panel, and upon detecting the acknowledgement message on the data communications bus, determines if the acknowledgement message indicates that first digital message received by the control panel is identical to the second digital message in its output buffer. If the acknowledgement message indicates that first digital message received by the control panel is identical to the second digital message in its output buffer, then the message in the output buffer is discarded. If, however, the acknowledgement message indicates that first digital message received by the control panel is not identical to the second digital message in its output buffer, then the second digital message is sent from its output buffer to the control panel.

In a fourth aspect, the present invention is a security system that has a plurality of wireless transmitters, a wireless receiver in wireless communication with the wireless transmitters, and a control panel connected to the wireless receiver. A wireless message, which includes a transmitter product type, is received from the wireless transmitter. The control panel extracts the transmitter product type from the wireless message and then determines a response type to be performed as a function of the transmitter product type extracted from the wireless message. A response to the wireless message is then executed in accordance with the determined response type. The response type may be determined by the control panel by using the transmitter product type to lookup an associated response type in a response type table at the control panel. The wireless message also includes a unique identification number, and the transmitter product type may be a separate field from the unique identification number or it may be integral with the unique identification number. The unique identification number is initially programmed in the wireless transmitter by assigning the product type portion as a function of the transmitter type.

BRIEF DESCRIPTION OF THE DRAWING

FIG. 7 is an exemplary illustration of a product type table utilized in the present invention;

DETAILED DESCRIPTION OF THE INVENTION

Figure 1:
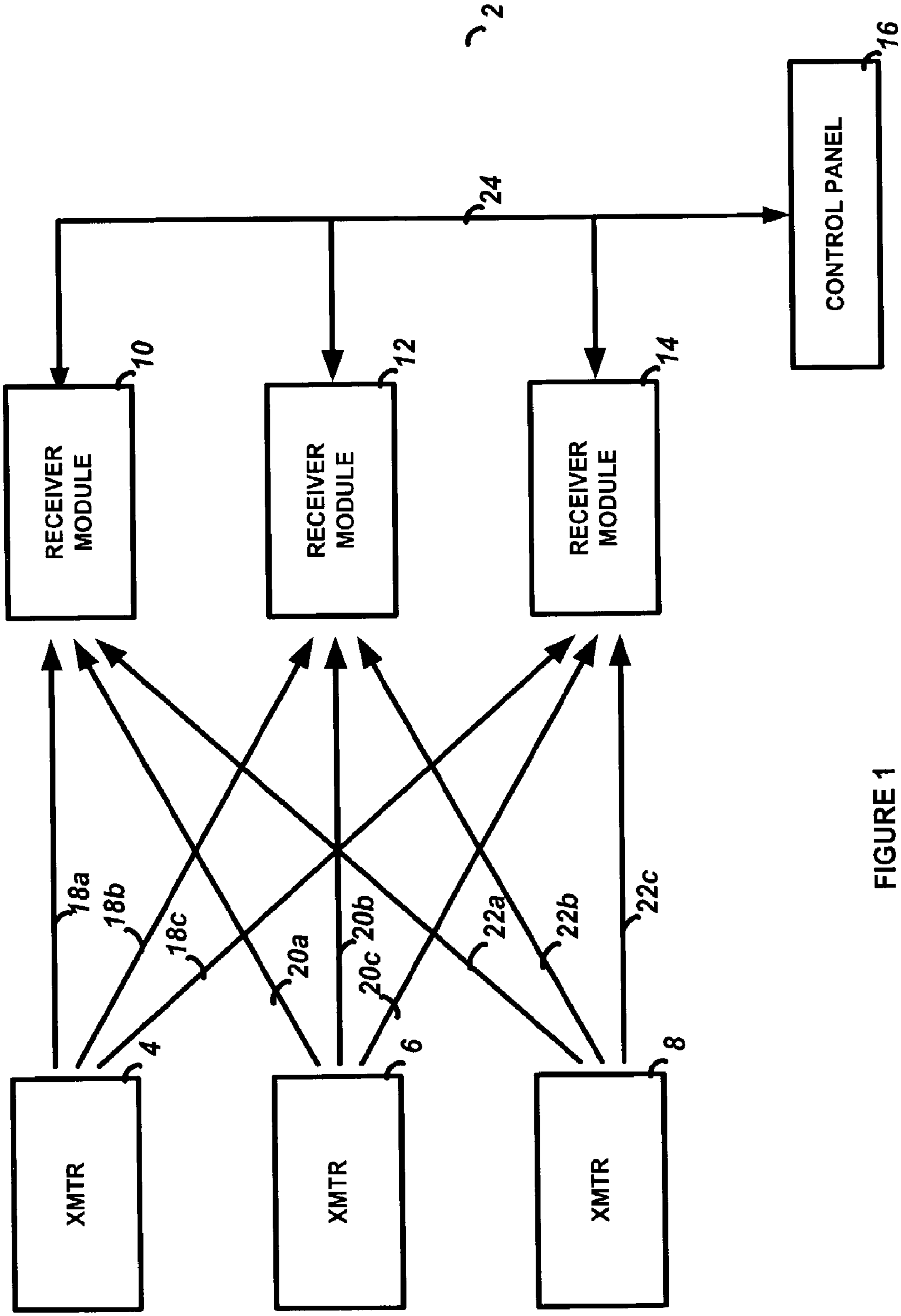
FIG. 1 is a block diagram of a wireless security system of the present invention having many transmitters and many receivers.

The preferred embodiment of the present invention will now be described with respect to the Figures. FIG. 1 illustrates a block diagram of the preferred embodiment wireless security system of the present invention. A security system 2 is shown, which includes a number of wireless transmitters 4, 6, and 8. The transmitters 4, 6, and 8 are associated with various types of alarm or security detectors such as motion sensors, door status detectors, smoke alarms, and the like, which operate to monitor a condition of the premises and send status messages to the control panel via the wireless transmitter/receiver module pair. Specific characteristics of these various detectors are not shown here for the sake of clarity, but are well known in the art of security systems. Many transmitters are likely used in the security system 2 as may be required by a particular application; only three such transmitters are shown in FIG. 1 for the sake of clarity.

Wireless receiver modules 10, 12 and 14 are also shown in the general system block diagram of FIG. 1. These receiver modules are placed strategically throughout the premises being monitored, such as one or more per floor of a building, so that the entire area being monitored is provided with adequate reception for each of the wireless transmitters in the system. Many receiver modules are likely used in the security system 2 as may be required by a particular application; only three such receiver modules are shown in FIG. 1 for the sake of clarity.

Each of the receiver modules 10, 12, 14 are shown hardwired by means of a communications bus 24 to a control panel 16, which will be strategically located in the premises being monitored, as is well known in the art. Other components of the security system 2, such as a dialer, siren, etc., are not shown for the sake of clarity, but are well known in the art of security systems.

Thus, in the general system diagram of FIG. 1, transmitter 4 will send wireless messages via signals 18*a*, 18*b*, and 18*c*, which are received by receiver modules 10, 12 and 14 respectively (the message is broadcast as one signal but is shown along three different paths for purposes of illustration). Depending on the distance between the transmitter 4 and each of the receivers 10, 12 and 14, one or all of these signals may or may not be adequately received and processed; thus the need for multiple receivers placed throughout the premises. Likewise, wireless messages are sent from the transmitter 6 to each of the receivers 10, 12 and 14 via signals 20*a*, 20*b*, and 20*c*; and wireless messages are sent from the transmitter 8 to each of the receivers 10, 12 and 14 via signals 22*a*, 22*b*, and 22*c*. The problems attendant to the multiplicity of transmitters and receivers, as discussed above, are solved by the present invention.

Figure 2:
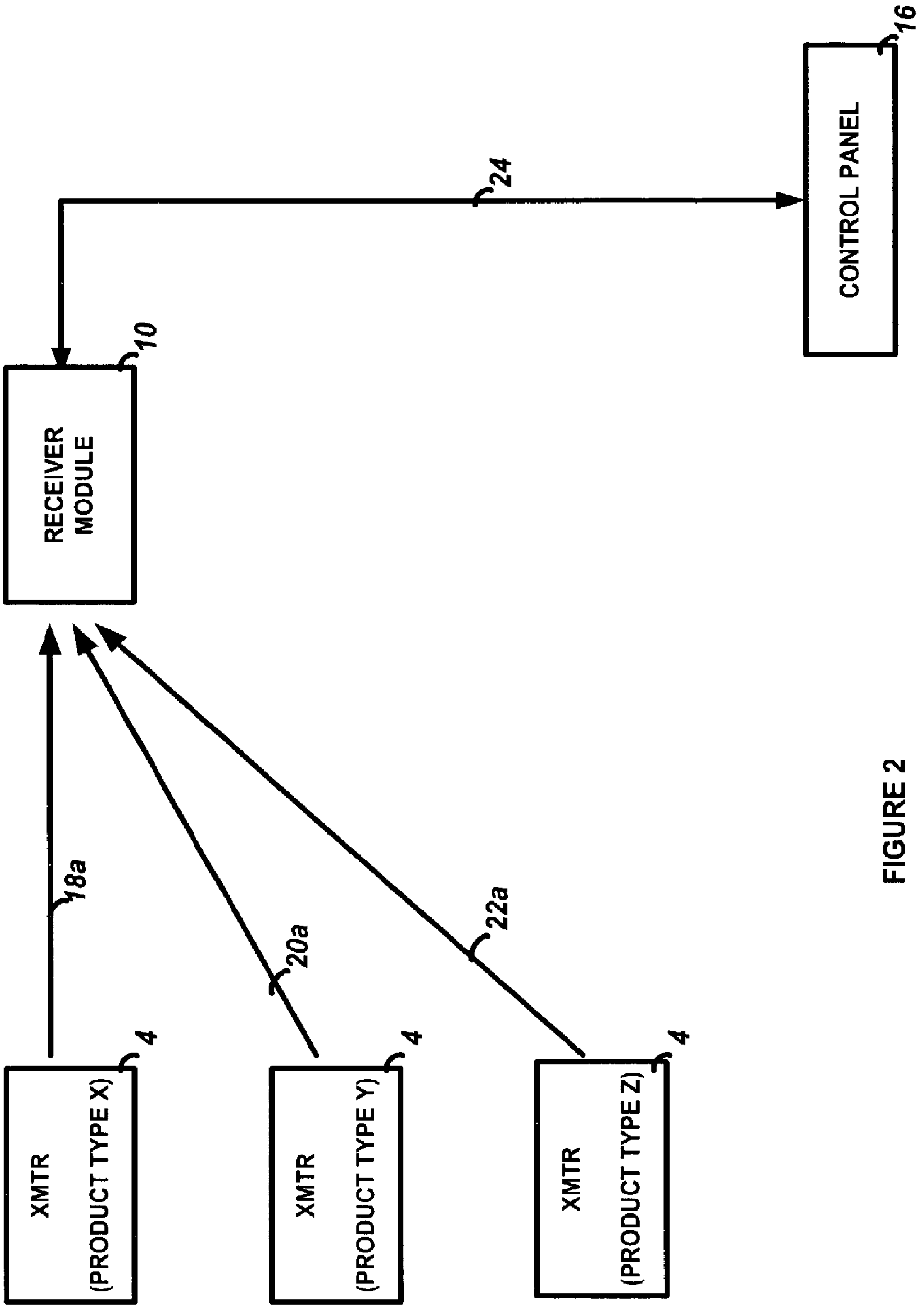
FIG. 2 is a block diagram of the security system of FIG. 1, showing many transmitters transmitting to an exemplary receiver.

In accordance with a first aspect of the invention, reference is made to FIG. 2, which illustrates the multiple transmitters 4, 6 and 8 with only one exemplary receiver module 10, which receives wireless messages, at varying times, via signals 18*a*, 20*a*, and 22*a*. Wireless transmitter 4 is associated with an alarm sensor of product type X, wireless transmitter 6 is associated with an alarm sensor of product type Y, and wireless transmitter 8 is associated with an alarm sensor of product type Z. In the present invention, product types are assigned to each transmitter as set forth below.

Figure 4:
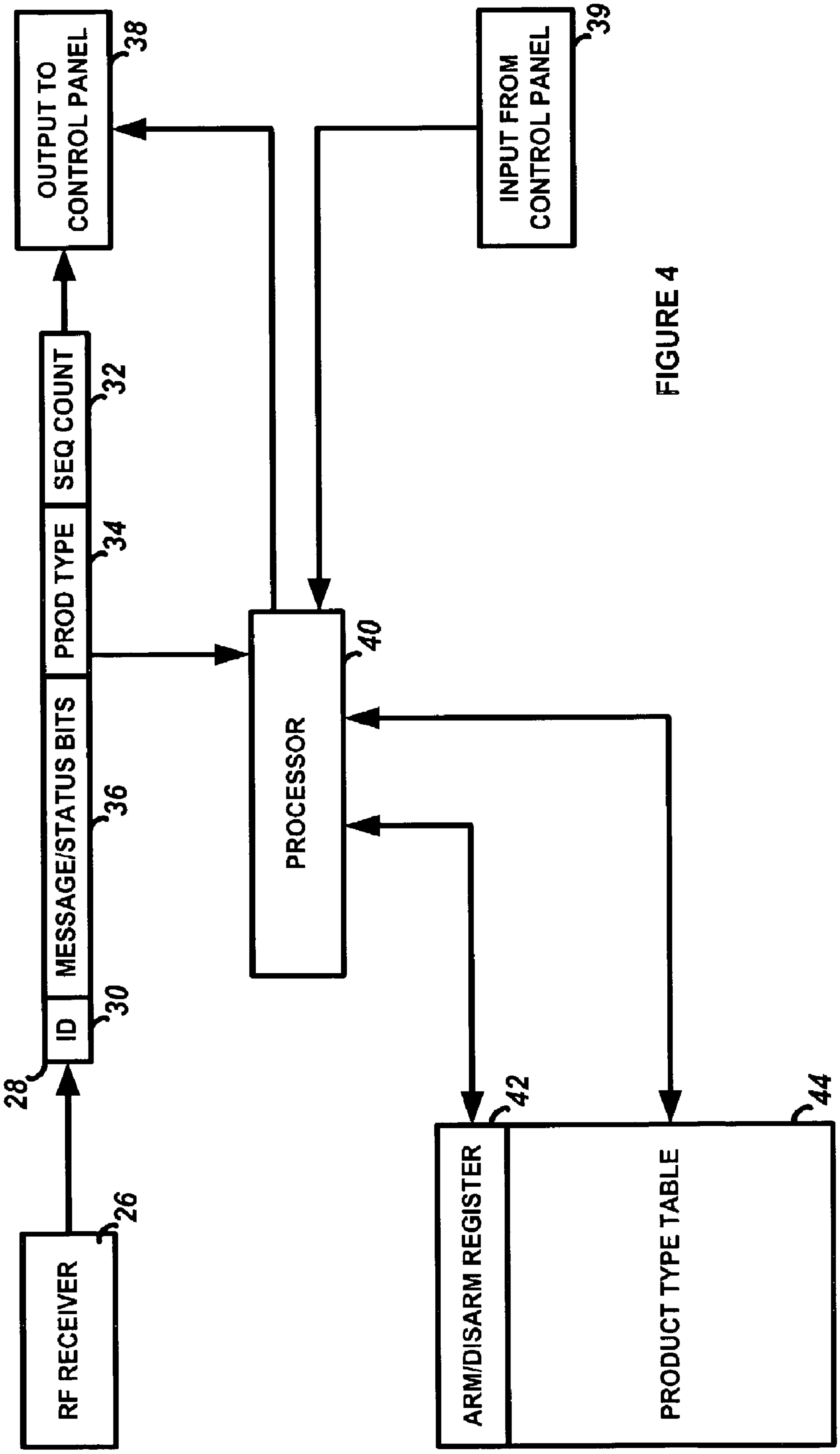
FIG. 4 is a block diagram of the receiver module utilized in FIGS. 1-3.

FIG. 4 illustrates a block diagram of the receiver module 10 that operates in accordance with the first aspect of the preferred embodiment of the present invention. During operation of the system, an RF message, of transmission format well known in the art, is detected by the RF receiver 26. The RF message is converted to a digital message 28 (which includes transmitter identification number or ID bits 30, sequence count 32, transmitter product type bits 34, and message/status bits 36) as is well known in the art. The processing circuitry 40 first determines if the system is in the armed or disarmed state, by reference to the arm/disarm register 42 in local memory. This register may be as simple as a status bit or flag that is set via a message from the control panel that indicates the arm/disarm state of the system. In any event, by referring to the arm/disarm register 42, the receiver module will be able to determine how to treat the message 28 in accordance with the invention.

If the register 42 indicates that the system is in the armed state, then the message 28 will simply be passed on from the output buffer 38 to the control panel 16 via the communications bus 24 for normal processing. If, however, the system is determined to be in the disarmed state, then the receiver module will further process the message to determine if it should be discarded or sent on to the control panel 16. First, the product type bits 34 are extracted from the message 28 by the processing circuits 40. In addition, the product type for that message is looked up in the product type table 44 in the receiver's memory. If the product type bits are indicated in the table 44 to be of an "essential" type (which is pre-determined by the system designer or installer), then the message 28 is passed onto the control panel. If, however, the product type bits are indicated in the table 44 to be of a "non-essential" type, then the message 28 is discarded without being passed on to the control panel. Thus, by defining the product types as essential or non-essential, the system designer/installer can control which product types will have their messages discarded, and which ones will have their messages passed on to the control panel during the disarmed state. As previously mentioned, all messages will be passed on to the control panel when the system is in the armed state since all such messages are considered to be essential when the system is armed.

FIG. 7 illustrates an exemplary product type table that is used in the preferred embodiment of the present invention. A 5-bit product type field is shown, which provides 32 different product types that may be used in the system. Of course, a bigger or smaller field may be used as needed by the system designer. In this case, 32 different product types are provided, such as PIR motion detectors, smoke detectors, heat sensors, door status detectors, microwave motion detectors, window status detectors, etc., as are well known in the art of security systems. As shown in FIG. 7, all PIR motion detectors will have a product type ID of "00000" and are indicated to be non-essential. All smoke detectors will have a product type ID of "00001" and are indicated to be essential. All heat detectors will have a product type ID of "00010" and are indicated to be essential. All door status detectors will have a product type ID of "00011" and are indicated to be essential. All microwave motion detectors will have a product type ID of "00100" and are indicated to be non-essential. All window status detectors will have a product type ID of "00101" and are indicated to be essential. Other product types may of course be included, and/or the definition of which ones are essential or non-essential may be changed, in accordance with the desires of the system designer and/or installer.

Thus, for example, when a message is received with a product type ID of 00100, and the system is in the disarmed state, then the processing circuitry will look up that product type from table 44 and thus determine that the message is from microwave motion detector and is therefore not essential. The message will be discarded and not passed on to the control panel. Had the system been in the armed state, then the message would have been passed on to the control panel regardless if it is essential or non-essential during the disarmed state.

Figure 8:
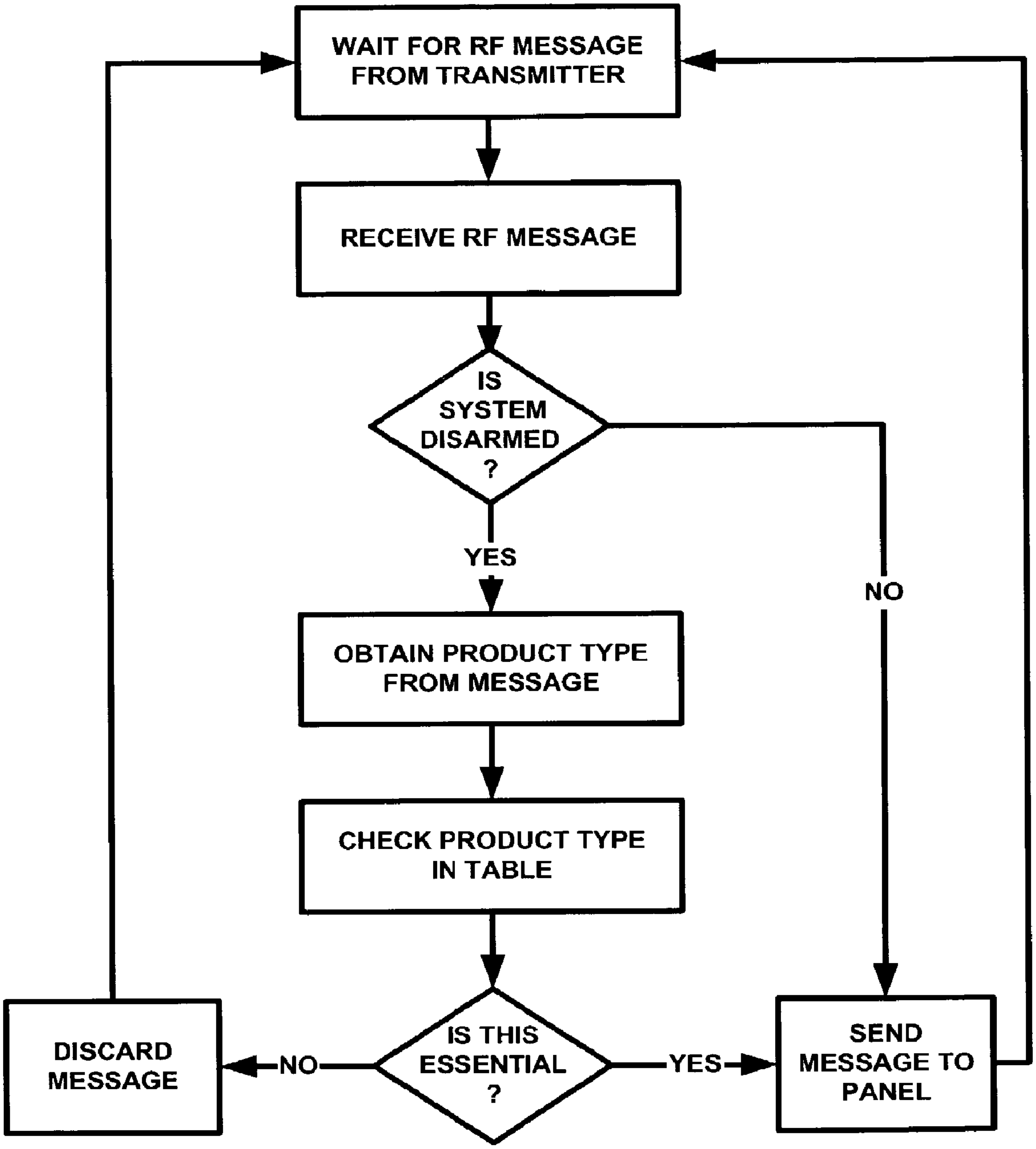
FIG. 8 is a flowchart of the operation of a first aspect of the present invention.

FIG. 8 illustrates a flowchart that shows the operation of the present invention as described herein. The receiver module waits for an RF message from a transmitter, and after receipt of a message checks if the system is in the armed or disarmed state. If not disarmed, then the message is passed on to the control panel without further processing by the receiver. If disarmed, then the product type bits are extracted from the message and used to perform a look-up in the product type table. If the product type bits indicate that the message has been transmitted by an essential transmitter, then the message is passed on to the control panel. If, however, the product type bits indicate that the message has been transmitted by a non-essential transmitter, then the message is discarded without being passed on to the control panel.

Figure 5:
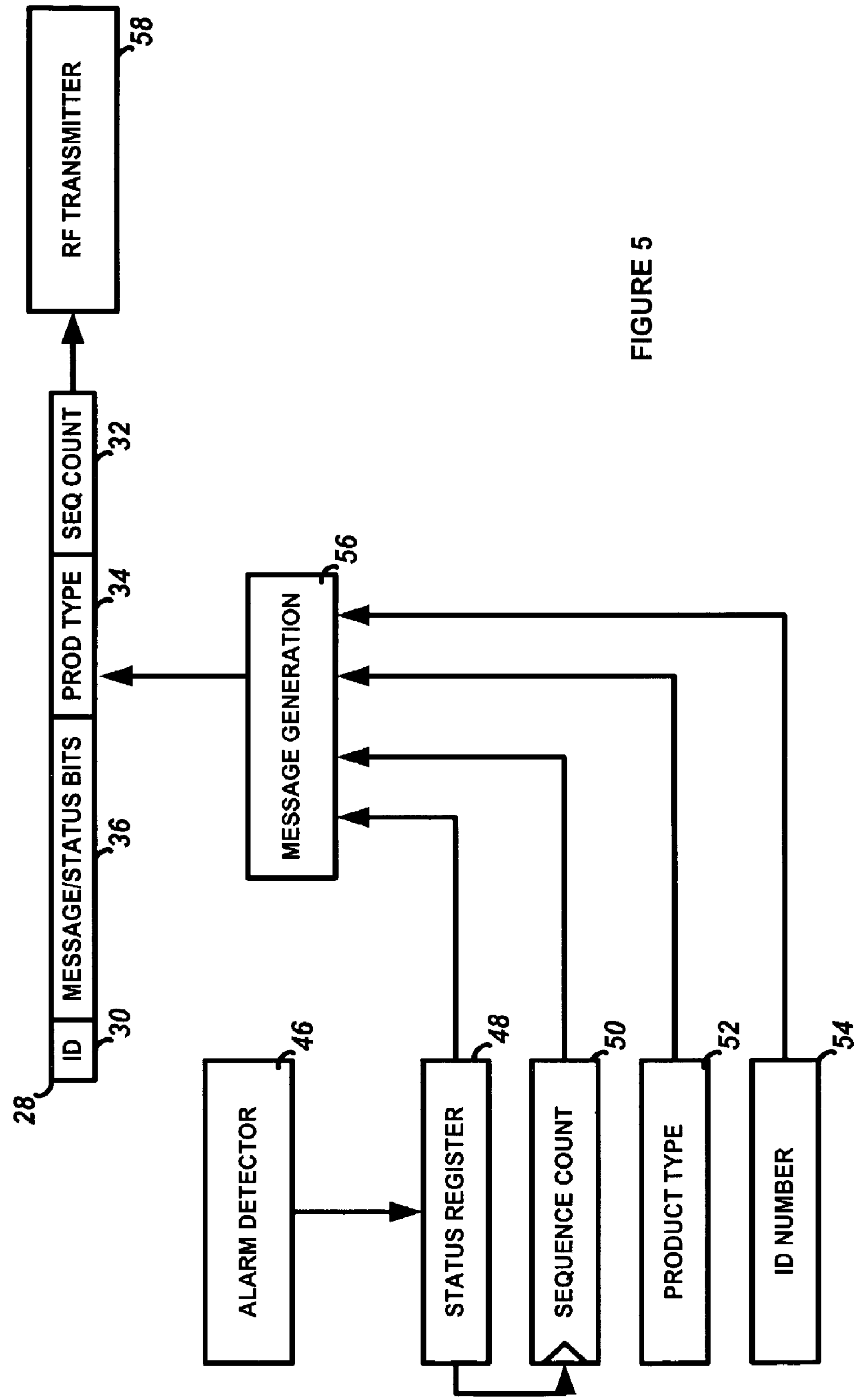
FIG. 5 is a block diagram of the transmitter utilized in FIGS. 1-3.

FIG. 5 illustrates a block diagram of the transmitter device as used in the present invention. The product type ID bits 52 and the identification number 54 (serial number) are stored in nonvolatile memory such as EEPROM as is well known in the art. A status register 48 is used to provide status of the security system detector 46, battery status, etc. as is well known in the art. A sequence count register 50 is used in the second aspect of the invention described below to provide a transmission sequence count, which is updated with each new transmission event (identified by the message in which at least one bit in the status register has changed from the previous transmission). These pieces of information are assembled by message generation logic 56 into the message 28 that is transmitted by RF transmitter 58 as is well known in the art. The various registers and the message generation logic may be implemented by a microprocessor device, ASIC, or dedicated logic. Thus, by configuring a given product with certain product type bits 52, the action taken by the receiver module, when the system is in the disarmed state, can be controlled as previously described.

In a system with multiple receivers as shown in FIG. 1, the product type table will be the same in each receiver, so that each receiver will process a message in the same manner. Thus, the product type table is loaded into memory in each receiver from a message sent by the control panel to the receiver, or by way of a programming message sent via RF into each receiver in a programming mode, etc.

In accordance with a second aspect of the invention, the problems associated with having multiple receivers receiving messages from the same transmitter at different times is addressed. If an installation requires that more than two RF receivers must be distributed in strategic locations throughout the system and connected to a single security control via a single communication bus, the use of sequence information in the transmitted signal will permit the control panel to properly process the received signals. To clarify this point, assume a 3-bit sequence number contained within the transmitted signal information which is advanced one increment in a given transmitter each time the transmitter has to transmit a new event. The new event may be the opening of a door or the closing of that same door. Assume further that it takes 2-4 seconds for the transmitter to repeat the required number of identical "opening" or "closing" messages per event. If the door is opened and closed within the 2-4 second time interval, it is possible for the control panel to receive the opening and closing reports from one RF receiver and only the opening report from another receiver which may be in marginal range from the given transmitter. Without a sequence count included as part of the transmitted events, the control could erroneously determine the final state of the door to be open rather than closed if it processed the initial opening event from the second receiver after processing the closing event from the first receiver. The larger the number of receivers used on the common control bus the greater would be the probability of this type of control error. With a sequence count included in the transmitted messages as in the present invention, the count of the opening event would be lower than that of the closing event, since the opening event preceded the closing event, indicating to the control that the final state of that door must be closed.

Figure 3:
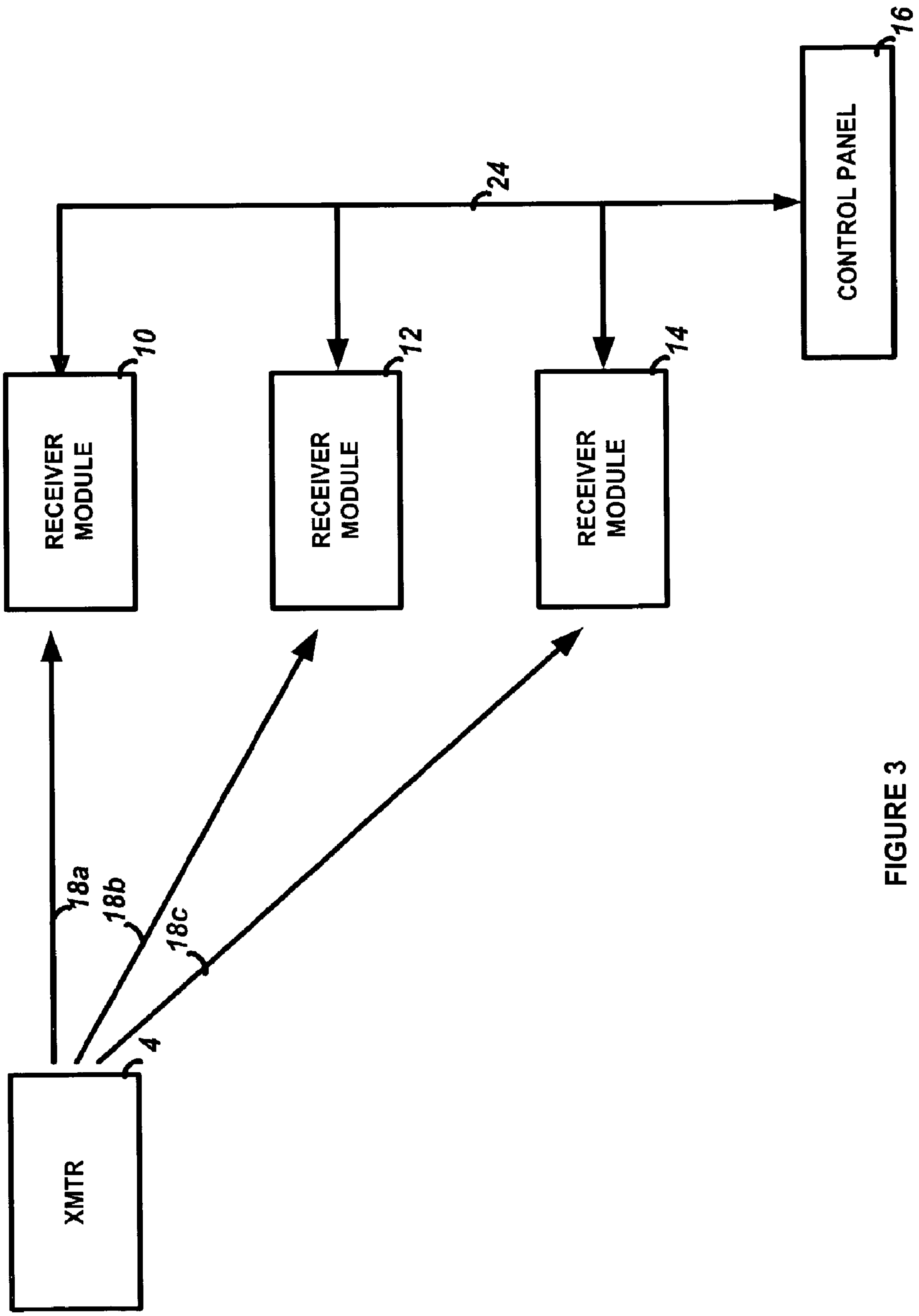
FIG. 3 is a block diagram of the security system of FIG. 1, showing an exemplary transmitter transmitting to many receivers.

FIG. 3 illustrates an exemplary transmitter 4 used in conjunction with the multiple receivers 10, 12, 14. Transmitter 4 transmits a wireless message, shown as being received by the wireless receivers 10, 12 and 14 as signals 18*a*, 18*b*, and 18*c*, respectively (the message is broadcast as one signal but is shown along three different paths for purposes of illustration).

Figure 9:
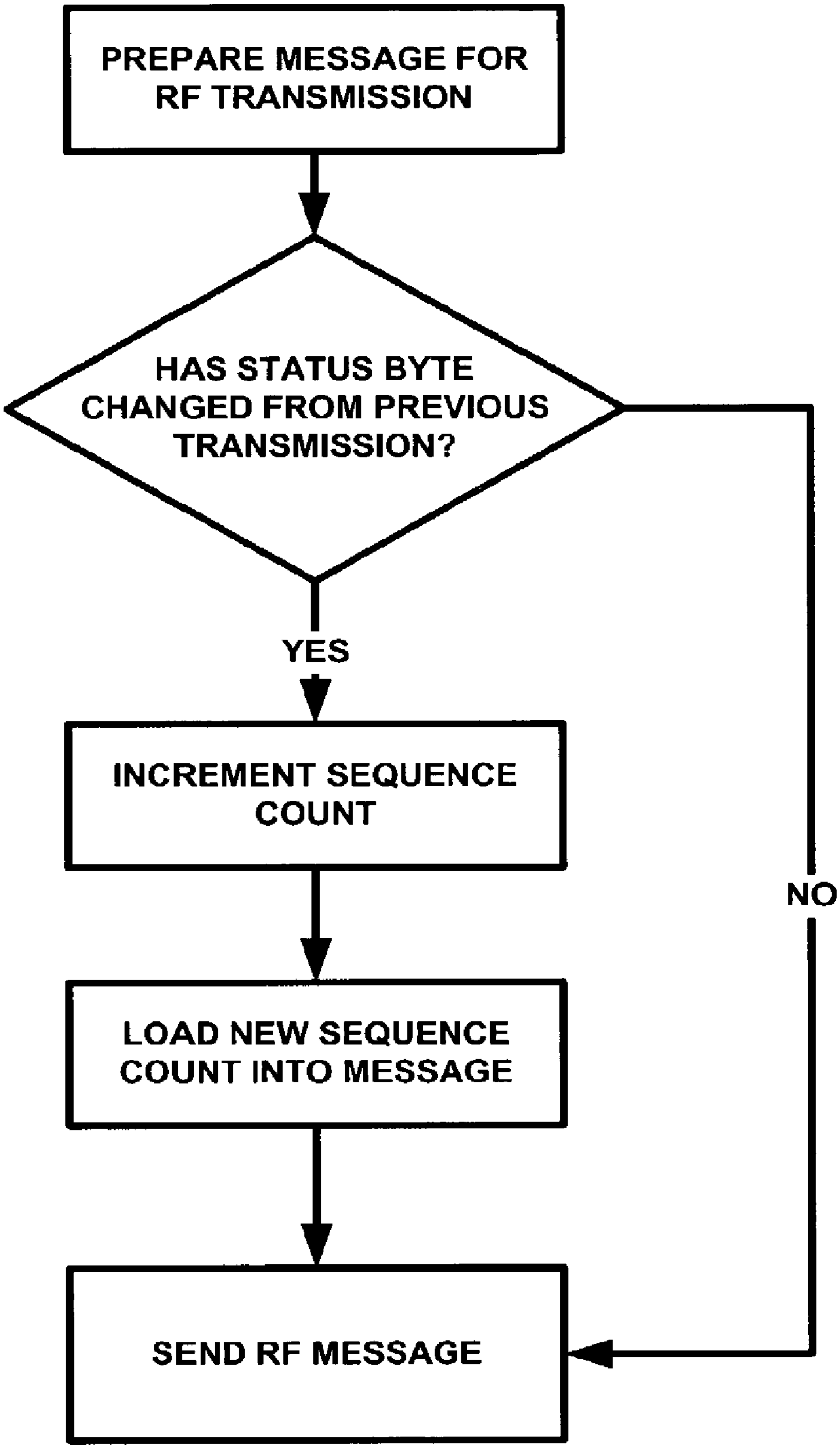
FIGS. 9 and 10 are flowcharts of the operation of a second aspect of the present invention.

Referring again to the transmitter block diagram of FIG. 5 and to the logic flowchart of FIG. 9, the sequence count register 50 is used to provide a transmission sequence count, which is incremented with each new transmission event (identified by the message in which at least one bit in the status register 48 has changed from the previous transmission). Thus, logic associated with the status register 48 will increment the status count 50 when any bit has changed. The status bits 48, product type ID bits 52 and the identification number 54 (serial number) are assembled along with the sequence count by message generation logic 56 into the message 28 that is transmitted by RF transmitter 58. Thus, by incrementing the sequence count 50 whenever a status bit has changed, the control panel can determine if a message has been received out of sequence from a given transmitter as described herein.

The transmitter 58 transmits the wireless message, which includes the unique transmitter identification number, the status bits, and the sequence count for that transmitter. Of course, each transmitter in the system will likely have different sequence counts at any given time since each transmitter operates asynchronously from each other. As described below, the control panel will track the sequence count for each transmitter individually to determine the proper sequencing for each transmitter.

Figure 10:
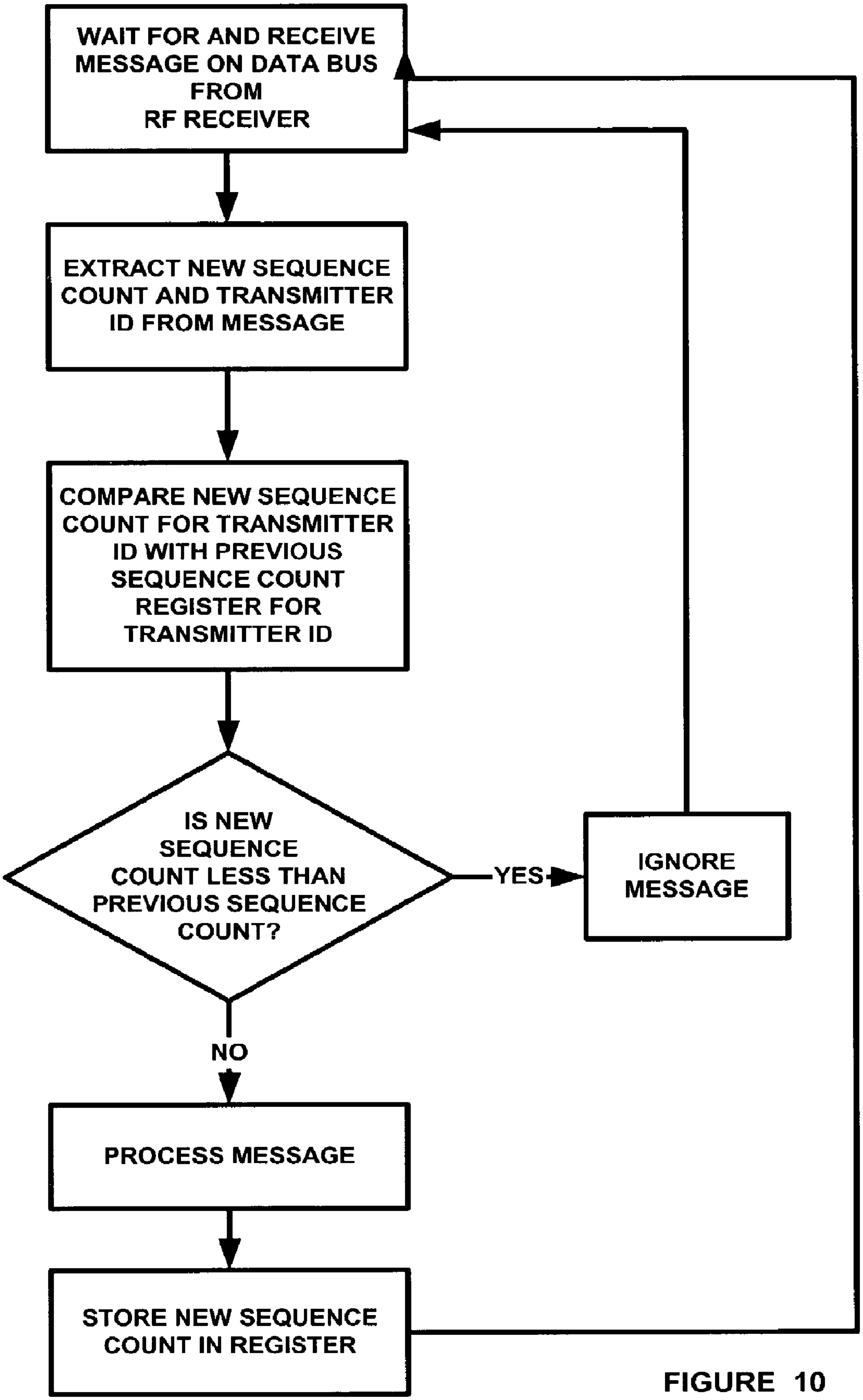

Each receiver 10, 12, 14 receives the wireless message, converts the wireless message to a digital message as is well known in the art, and then sends the digital message to the control panel 16 via bus 24. With reference to the block diagram in FIG. 6 and the logic flowchart in FIG. 10, the processor circuit 64 of the control panel 16 then processes the digital message 28 received at input block 60 by first extracting the sequence count 32 and transmitter identification number 30 from the message. A previous sequence count associated with the transmitter identification number is retrieved from a sequence count table 66 in memory. The sequence count 32 from the message is compared by processor 64 with the previous sequence count 65 retrieved from the table 66. If the sequence count 32 from the message is less than the previous sequence count 65, then the control panel ignores the message and takes no further action. If, however, the sequence count 32 from the message is not less than the previous sequence count 65, then the control panel processes the message (i.e. the status bits 36) and replaces the previous sequence count 65 in the table 66 with the sequence count 32 from the message.

As such, if a message is received "late" from any of the receivers—meaning that it contains stale information that would mislead the control panel—then it will be ignored by the control panel. As described above, this may happen for example if a door is opened then quickly closed, such that a "door open" sextet of messages is sent by a transmitter, then a "door closed" sextet of messages sent by the transmitter immediately thereafter. Since one of the messages from the "door open" sextet may arrive at the control panel after one of the messages from the "door closed" sextet (due to processing delays by distant receivers, dropped bits, etc.), the control panel will determine with this invention that the sequence count from the "door open" message is less than that of the "door closed" message and ignore it accordingly. This invention thereby allows the control panel to determine if a message received from a certain transmitter may be out of sequence due to delays in reception, processing, etc. by one of the receivers in the system.

It is noted that at some point, the sequence count must wrap around to zero. In the preferred embodiment that uses a 3-bit sequence count, the count sequence will be 0, 1, 2, 3, 4, 5, 6, 7, 0, 1, 2, 3, 4, etc. The processing logic is programmed to recognize that a count of 0 is considered to be greater than a count of 7, so that when 0 is detected after a 7, the control will not erroneously regard that as an out of sequence transmission.

Figure 11:
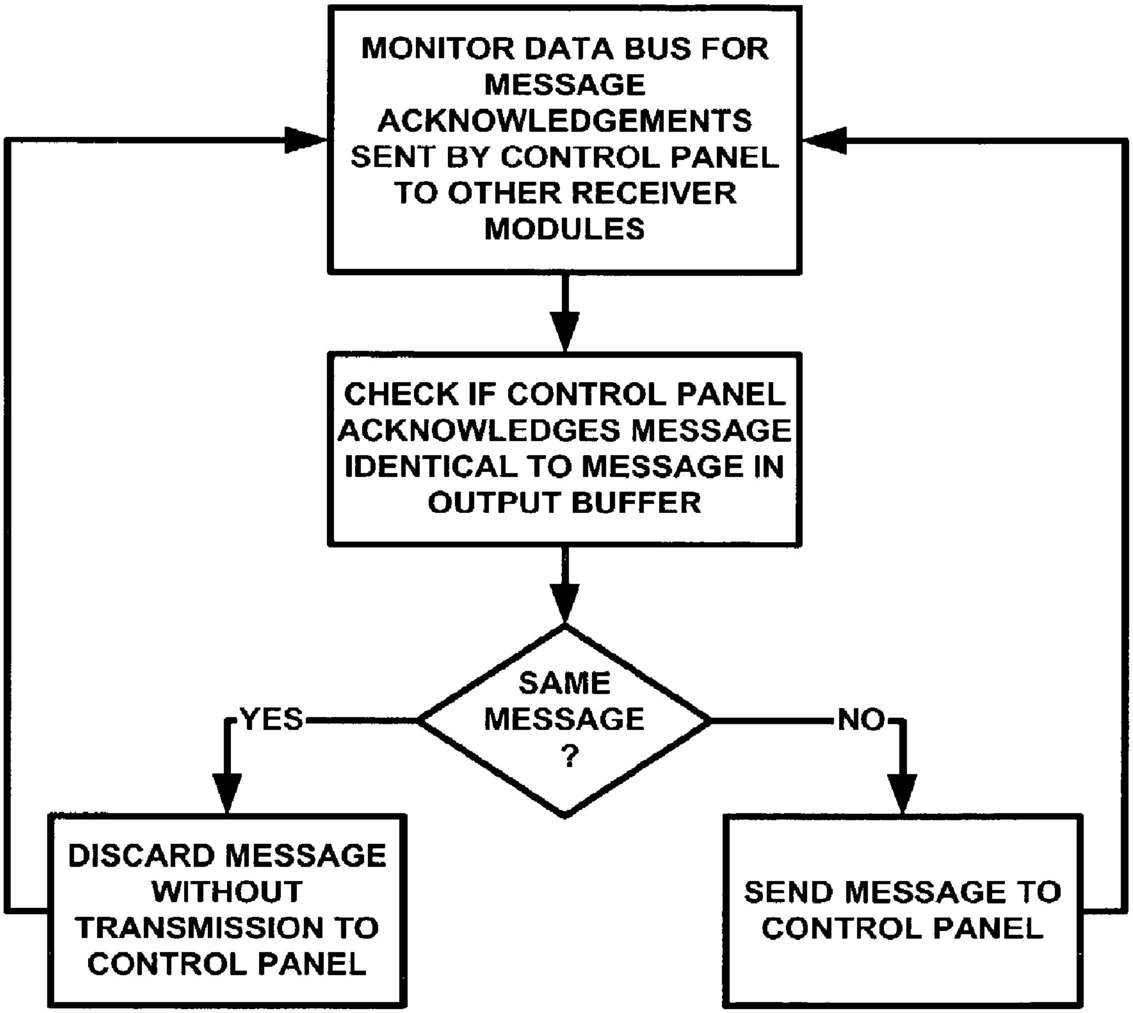
FIG. 11 is a flowchart of the operation of a third aspect of the present invention.

In accordance with a third aspect of the present invention, problems are addressed that are associated with multiple identical messages being sent over the communications bus to the control panel, which would unnecessarily tie up bus capacity and control panel processing capabilities. With reference to the logic flowchart in FIG. 11 and again to FIG. 4, the digital message that is sent from the receiver module to the control panel is first held in an output buffer 38 prior to actual transmission over the data communications bus.

While the digital message is being held in the output buffer pending transmission to the control panel, the receiver module monitors the data bus 24 for message acknowledgements that have been sent from the control panel over the bus, that indicate that the control panel has successfully received a given message from another receiver in the system. This acknowledgement is part of the messaging protocol implemented by the system to ensure that messages are successfully received by the control. That is, when the control panel receives a message and successfully decodes it, it will issue an acknowledgement message from its output buffer 61 (see FIG. 6) onto the communication bus that indicates successful reception. Normally, in prior art systems, without an acknowledgement the receiver will make multiple attempts to transmit the message to ensure the control gets the message; once the acknowledgement is detected, the receiver will cease sending the message to the control to avoid duplicative bus traffic. In prior art systems, a receiver only listens for acknowledgements that are addressed to itself with respect to its own recent transmissions. In accordance with this third aspect of the invention, however, all receivers listen to all acknowledgements issued by the control panel and check their own output buffers to see if the control panel acknowledges receiving a message from another receiver that may in fact be identical to the message they have queued in their output buffer. If this message is identical, then it will discard the message without sending it out of the buffer. If the messages are not identical, then the receiver will send the message in the normal course of transmission timing. Thus, if a receiver does not detect the transmission and acknowledgement of a given message from a different receiver and the control at the time it is ready to transmit its own (same) message when the communications bus is idle, it will seize the bus and transmit that message to the control.

For example, a first receiver 10 receives a first wireless message, converts the first wireless message to a first digital message, and then sends the first digital message to the control panel 16. A second receiver 12 receives a second wireless message, converts the second wireless message to a second digital message, and places the second digital message in its output buffer 38 for subsequent transmission to the control panel 16. The control panel 16 receives the first digital message from the first receiver 10, and then sends an acknowledgement message on the data bus 24 indicating that the first digital message has been successfully received. The second receiver 12 monitors data transmissions on the data communications bus 24 from the control panel 16, and upon detecting the acknowledgement message on the data communications bus 24, then determines if the acknowledgement message indicates that first digital message received by the control panel 16 is identical to the second digital message in its output buffer 38. If the acknowledgement message indicates that first digital message received by the control panel is identical to the second digital message in its output buffer 38, then the message in its output buffer has already been successfully sent to the control by the first receiver and is, consequently, discarded by the second receiver. If, however, the acknowledgement message indicates that first digital message received by the control panel is not identical to the second digital message in its output buffer, then the second digital message is normally sent from its output buffer to the control panel.

In accordance with a fourth aspect of the invention, the product type bits in the wireless message transmitted by the transmitter are utilized by the control panel for determining the specific response that should be executed. In the prior art, at the time of installation, the installer must assign a particular response type at the control panel to a transmitter's particular serial or identification number. During the control panel programming, the installer will assign a panel fire response to the smoke detectors, a burglary response type to perimeter serial numbers, etc. In some control panels, there may be 256 zones that need to be programmed, which is time consuming and error prone. By embedding the product type field within the message as described above, the initial zone response programming is not necessary, saving installation time and reducing errors. The panel knows from the product type in the wireless message which response type to automatically assign.

Figure 6:
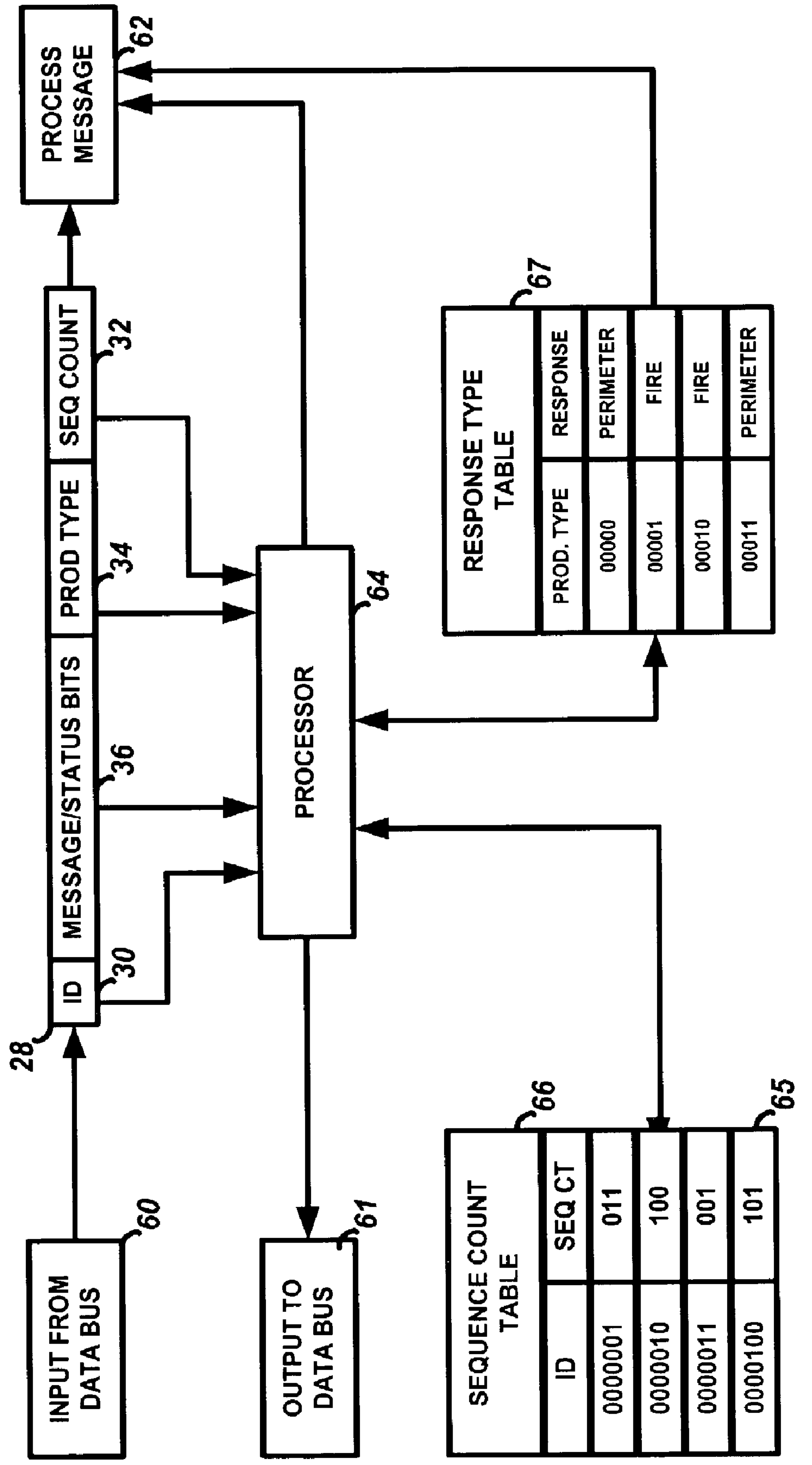
FIG. 6 is a block diagram of the control panel utilized in FIGS. 1-3.

As described above, the wireless message containing the product type field is transmitted by the transmitter, received wirelessly by a receiver in the system, converted to a digital message suitable for transmission over the data bus, and then sent over the bus to the control panel. As shown in FIG. 6, the wireless message is input to the control panel from the data bus and operated on by processing logic 64. In particular, the processor will extract the product type bits 34 and use those bits to reference a response type table 67. The table 67 will provide a response type output, such as a "fire response", that will be used to further process the message. For example, when a message is received from a smoke detector transmitter, the product type field would be 00001, which would return a code for the "fire response" from the table 67. The control panel would process the message as a fire response (which might include notification of the local fire department, etc.) accordingly. In another example, when a message is received from a window closure transmitter, the product type field would be 00101, which would return a code for the "perimeter response" from the table 67. The control panel would process the message as a perimeter response (which might include notification of the local security personnel or police department, etc.) accordingly.

Thus, by including the response type table 67 in the control panel (which could be programmed at the factory and/or by the system installer), the need to program individual response types for each and every transmitter serial number that is enrolled into the system at installation is advantageously avoided. That is, the transmitters themselves will be configured at the factory with the appropriate product type field in register 52 (FIG. 5) and will then be ready to operate with any control panel that includes the appropriate response type table 67.

Figure 12A:
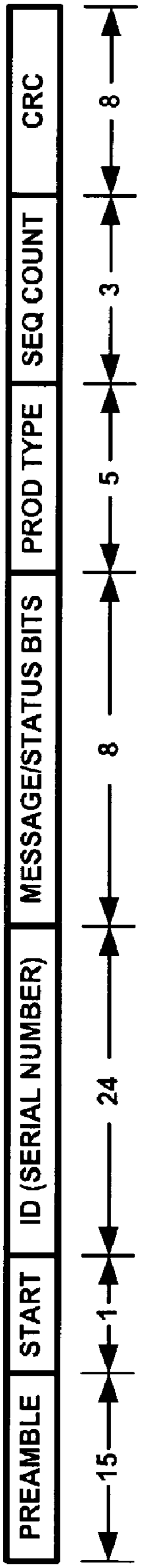
FIGS. 12*a* and 12*b* illustrate two alternative message formats used with the invention.

FIG. 12(*a*) illustrates the message format used by the present invention for automatic recognition of the transmitter product type with a 5-bit product type field. The message includes a 15-bit preamble (which of course could be a different length depending on the design choice), a single start bit, a 24-bit unique identification or serial number, an 8-bit message, a 3-bit sequence count, a 5-bit product type field, and an 8-bit CRC. The message is phase encoded Manchester format transmitted between 3.2 Kbaud and 4.2 Kbaud (period between 156.3 usec and 119 usec), typically at 3.7 Kbaud (period of 135 usec).

In an alternative embodiment of this invention, it is desired to be able to use a product type field, and all of the advantages relevant thereto as discussed above, in a format so that the format will operate properly with older "prior art" control panels (i.e. control panels not configured to interpret and act on a product type field) as well as control panels configured under this invention. By including the product type field "within" the serial/identification number (actually, as the four least significant bits (LSB's) of the serial number), then the message format will be compatible with older control panels. FIG. 12(*b*) illustrates a message format that utilizes a 4-bit product type field as the 4 LSB's of the 24-bit serial number. The message bits are in an 8-bit field, and there is a 16-bit CRC (there is no sequence count in this embodiment since a sequence count would not be compatible with older control panels).

Figure 12B:
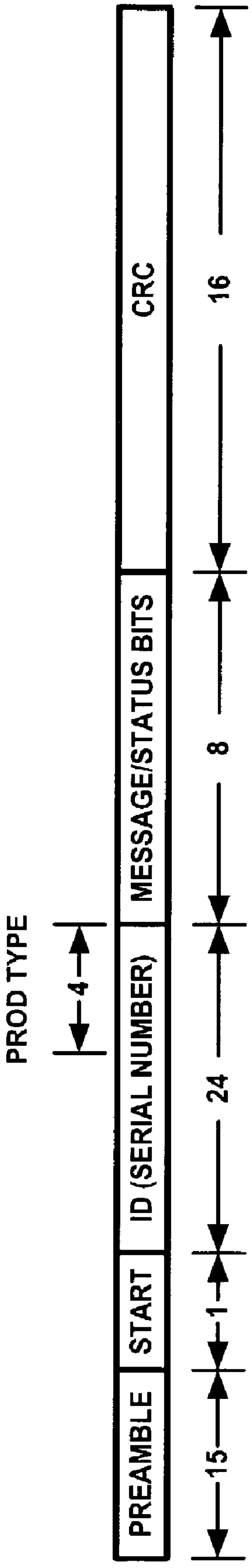

Although the specific location within the message of the product type bits could be varied in accordance with a specific system design, the preferred embodiment provides for placement of the product type bits as shown in FIG. 12*b*. Control panels configured in accordance with the present invention will be programmed to extract those bits from that location and process them as described above. Certain control panels in the prior art that are not configured to utilize the product type bits of the present invention will expect the entire serial number in place of the serial number and product type bits as shown by the 24-bit serial number of FIG. 12*b*. When a control panel not configured with this invention (for example, a prior art control panel) reads the 24-bit serial number of the message format of FIG. 12*b*, it acts on the message as in the prior art, in particular by looking up the entire 24-bit serial number in a table to determine the response to be taken (as previously programmed by the installer). Since the prior art control panel won't care about the product type bits, it simply acts on the entire 24-bit field as with other prior art transmitters. Thus, backward compatibility has been achieved for the newer message format with the older control panels For example, the last four bits of the serial number could be programmed in the factory such that XXXXXXXXXXXXXXXXXXXX0000 means window/perimeter transmitter XXXXXXXXXXXXXXXXXXXX0001 means entry/exit door XXXXXXXXXXXXXXXXXXXX0010 means smoke detector XXXXXXXXXXXXXXXXXXXX0011 means motion detector etc. Of course, these meanings can be changed by the system designer as desired. In the prior art, the entire 24-bit field would be programmed without concern for the meaning of the last four bits.

It is noted that a 5-bit product type field is used with the message format in FIG. 12(*a*) (separate field) while a 4-bit product type field is used with the message format in FIG. 12(*b*) (integral field). Although a 5-bit field is preferred since it gives a larger number of product types than does a 4-bit field, the 4-bit field was used so that the actual serial number field (20 bits) would be large enough for practical use. If more product types are desired, then one can of course utilize the 5-bit field with a 19-bit serial number (the trade-off being less discrete serial numbers being available). Of course, a system designer may vary all of the field sizes to obtain the desired objectives.

Figure 13:
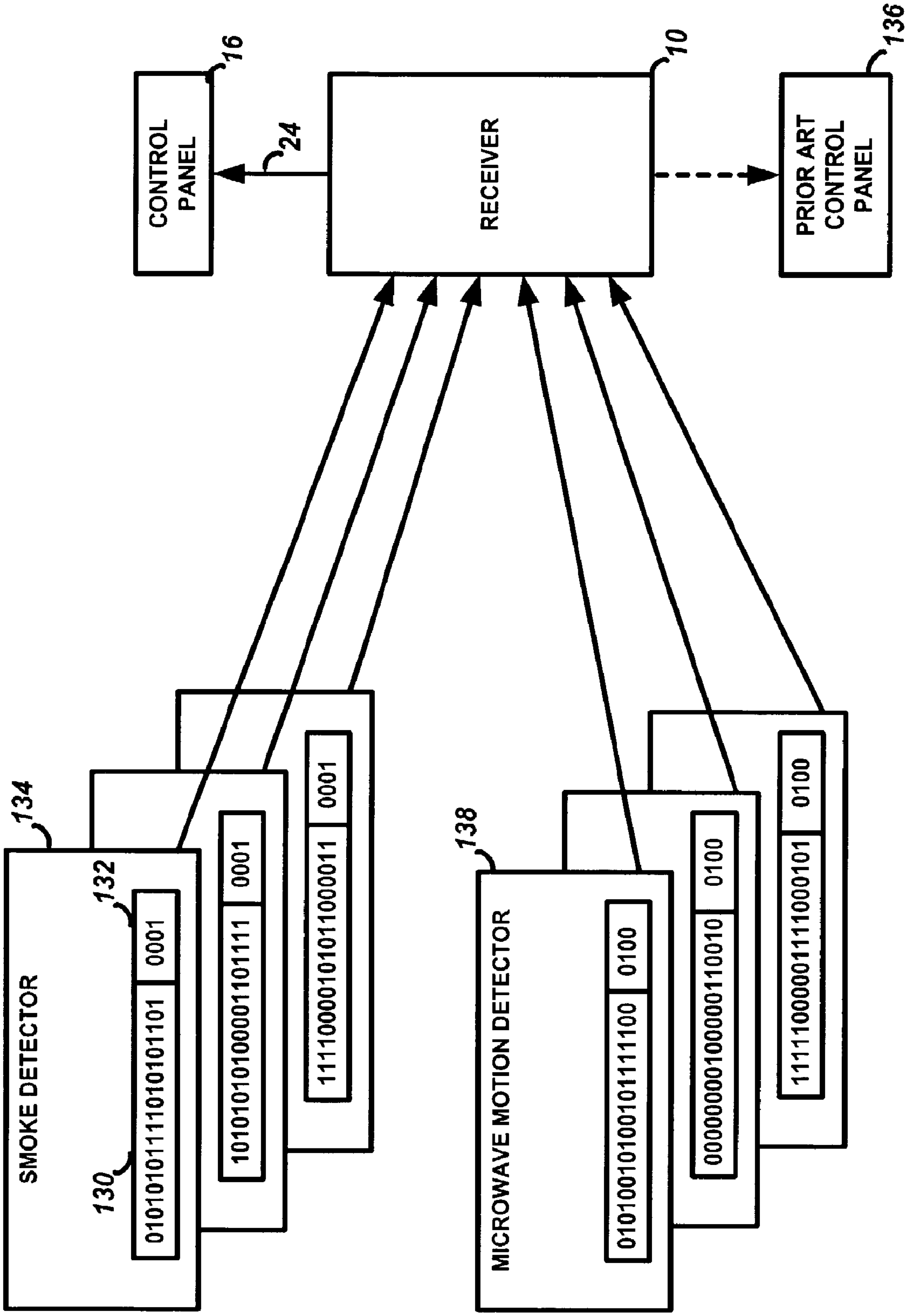
FIG. 13 illustrates the use of product type data with the present invention.

FIG. 13 provides an illustrative example of the use of a product type field programmed contiguously with the serial number field in order to achieve compatibility with prior art control panels as described herein. A series of smoke detectors 134 are programmed at the factory with serial number 130 and product type 132 as follows:

| Serial Number | Product Type |
| --- | --- |
| 01010101111010101101 | 0001 |
| 10101010100001101111 | 0001 |
| 11110000101011000011 | 0001 |

Likewise, a series of motion detectors 138 are programmed at the factory with serial numbers and product type as follows:

| Serial Number | Product Type |
| --- | --- |
| 01010010100101111100 | 0100 |
| 00000000100000110010 | 0100 |
| 11111000001111000101 | 0100 |

The serial/identification numbers may be programmed randomly, consecutively, or in any other manner so as to provide a unique number for each device. The devices are, however, specifically programmed with the appropriate product type numbers as defined by the design scheme. Thus, in this example, all smoke detectors are programmed with the product type 0001 and all motion detectors are programmed with the product type 0100. Of course since the serial number is unique for each device, the combination of the serial number and the product type will also be unique for each device.

When the devices 134, 138 are used with the control panel 16 of the present invention, the control panel 16 is programmed to extract the product type bits from the message as described above and act accordingly in accordance with a predefined response type table similar to that shown in FIG. 6 for the 5-bit product type. If, however, the system utilizes a prior art control panel 136, then the entire identification number/product type is read as a 24-bit identification number as follows:

For the Smoke Detectors 134:

24-Bit Serial Number

010101011110101011010001

101010101000011011110001

111100001010110000110001

For the Motion Detectors 138:

24-Bit Serial Number

010100101001011111000100

000000001000001100100100

111110000011110001010100

Thus, this methodology allows the devices utilizing this format to be used with control panels under this invention as well as pre-existing control panels that cannot interpret the product type data.

What is claimed is:

1. In a security system installed in a premises, said security system comprising a wireless transmitting security module, a wireless receiver module in wireless communication with the wireless transmitting security module, and a control panel connected to the wireless receiver module; the wireless transmitting security module comprising a wireless transmitter and an alarm detector for monitoring a physical condition of the premises, a method of operating the security system comprising the steps of:

a. transmitting a wireless message with the wireless transmitting security module that comprises a wireless transmitter and an alarm detector for monitoring a physical condition of the premises, the wireless message comprising a unique wireless transmitting security module identification number, a status portion comprising at least one status bit, and a sequence count, the sequence count being advanced one increment by the wireless transmitting security module each time a status bit has changed from a previous transmission, the status bit indicative of a state of the alarm detector that monitors a physical condition of the premises;

b. the wireless receiver module, in wireless communication with the wireless transmitting security module, receiving the wireless message, converting the wireless message to a digital message and sending the digital message to the control panel;

c. the control panel, connected to the wireless receiver module, processing the digital message by the steps of:

i. the control panel extracting the sequence count and wireless transmitting security module identification number from the message;

ii. the control panel retrieving from memory a previous sequence count associated with the wireless transmitting security module identification number;

iii. the control panel comparing the sequence count from the message with the previous sequence count from memory;

if the sequence count from the message is less than the previous sequence count, then the control panel ignoring the message; and if the sequence count from the message is not less than the previous sequence count, then the control panel processing the message and replacing the previous sequence count in memory with the sequence count from the message.

2. The method of claim 1 wherein the alarm detector is a motion detector.

3. The method of claim 1 wherein the alarm detector is a door status detector.

4. The method of claim 1 wherein the alarm detector is a smoke detector.

5. A security system for installation in a premises, comprising:

a. a wireless transmitting security module comprising a wireless transmitter and an alarm detector for monitoring a physical condition of the premises, and adapted to transmit a wireless message comprising a unique wireless transmitting security module identification number, a status portion comprising at least one status bit, and a sequence count, the sequence count being advanced one increment by the wireless transmitting security module each time a status bit has changed from a previous transmission, the status bit indicative of a state of the alarm detector that monitors a physical condition of the premises;

b. a control panel; and c. a wireless receiver module connected to the control panel and in wireless communication with the wireless transmitting security module, wherein each of the wireless receiver modules comprises an RF receiver that receives the wireless messages from the wireless transmitting security module, receiver processing circuitry that is adapted to convert the wireless messages to digital messages, and output circuitry that sends the digital messages to the control panel; and wherein the control panel comprises panel processing circuitry that is adapted to:

i. extract the sequence count and wireless transmitting security module identification number from the message;

ii. retrieve from memory a previous sequence count associated with the wireless transmitting security module identification number; and iii. compare the sequence count from the message with the previous sequence count from memory, wherein if the sequence count from the message is less than the previous sequence count, then the panel processing circuitry ignores the message; and if the sequence count from the message is not less than the previous sequence count, then the panel processing circuitry processes the message and replaces the previous sequence count in memory with the sequence count from the message.

6. The security system of claim 5 wherein the alarm detector is a motion detector.

7. The security system of claim 5 wherein the alarm detector is a door status detector.

8. The security system of claim 5 wherein the alarm detector is a smoke detector.

9. A method of transmitting a wireless message in a security system installed in a premises comprising the steps of:

a. generating a wireless message with a wireless transmitting security module comprising a wireless transmitter and an alarm detector for monitoring a physical condition of the premises, the wireless message comprising a unique wireless transmitting security module identification number, a status portion comprising a status bit indicative of a state of the alarm detector that monitors a physical condition of the premises, and a sequence count;

b. determining if the status bit in the status portion of the wireless message has changed from a previously transmitted wireless message;

c. if the status bit has changed, then incrementing the sequence count from the previously transmitted wireless message and the wireless transmitting security module transmitting the generated wireless message.

10. The method of claim 9 wherein the alarm detector is a motion detector.

11. The method of claim 9 wherein the alarm detector is a door status detector.

12. The method of claim 9 wherein the alarm detector is a smoke detector.

13. A wireless transmitting security module for use in a security system installed in a premises comprising:

a. an alarm detector for monitoring a physical condition of the premises;

b. processing circuitry adapted to:

i. generate a wireless message, the wireless message comprising a unique wireless transmitting security module identification number, a status portion comprising at least one status bit indicative of a state of the alarm detector that monitors a physical condition of the premises, and a sequence count;

ii. determine if the status bit in the status portion of the wireless message has changed from a previously transmitted wireless message; and iii. increment the sequence count from the previously transmitted wireless message if any of the status bits has changed; and b. an RF transmitter to transmit the generated wireless message.

14. The wireless transmitting security module of claim 13 wherein the alarm detector is a motion detector.

15. The wireless transmitting security module of claim 13 wherein the alarm detector is a door status detector.

16. The wireless transmitting security module of claim 13 wherein the alarm detector is a smoke detector.

17. A method of a control panel processing a message from a wireless transmitting security module in a security system installed in a premises, the method comprising the steps of:

a. the control panel extracting a sequence count and a unique wireless transmitting security module identification number from the message, the message comprising the unique wireless transmitting security module identification number, a status portion comprising at least one status bit indicative of a state of an alarm detector associated with the wireless transmitting security module that monitors a physical condition of the premises, and the sequence count;

b. the control panel retrieving from memory a previous sequence count associated with the wireless transmitting security module identification number;

c. the control panel comparing the sequence count from the message with the previous sequence count from memory;

i. if the sequence count from the message is less than the previous sequence count, then the control panel ignoring the message; and ii. if the sequence count from the message is not less than the previous sequence count, then the control panel processing the message and replacing the previous sequence count in memory with the sequence count from the message.

18. A control panel for use in a security system installed in a premises, comprising:

processing circuitry that is configured to process a message received from a wireless transmitting security module, the message comprising:

i) a unique wireless transmitting security module identification number, ii) a status portion comprising at least one status bit indicative of a state of an alarm detector associated with the wireless transmitting security module that monitors a physical condition of the premises, and iii) a sequence count, by a. the processing circuitry of the control panel extracting a sequence count and a wireless transmitting security module identification number from the received message;

b. the processing circuitry of the control panel retrieving from memory a previous sequence count associated with the wireless transmitting security module identification number; and c. the processing circuitry of the control panel comparing the sequence count from the message with the previous sequence count from memory, wherein i. if the sequence count from the message is less than the previous sequence count, then the processing circuitry of the control panel ignores the message; and ii. if the sequence count from the message is not less than the previous sequence count, then the processing circuitry of the control panel processes the message and replaces the previous sequence count in memory with the sequence count from the message.

* * * * *